United States Patent
Konishi

[11] Patent Number: 6,101,010
[45] Date of Patent: Aug. 8, 2000

[54] PASS-MONITORING APPARATUS OF OPTICAL NETWORK SYSTEM

[75] Inventor: Chitaka Konishi, Tokyo, Japan

[73] Assignee: NEC Corporation, Tokyo, Japan

[21] Appl. No.: 08/938,601

[22] Filed: Sep. 25, 1997

[30] Foreign Application Priority Data

Sep. 26, 1996 [JP] Japan .................................. 8-254513

[51] Int. Cl.[7] ................................................ H04B 10/08
[52] U.S. Cl. ........................... 359/110; 359/117; 359/128
[58] Field of Search .................................. 357/110, 120, 357/121, 129, 100, 128, 178, 176, 177; 385/17, 24; 359/124, 117

[56] References Cited

U.S. PATENT DOCUMENTS

| | | | |
|---|---|---|---|
| 5,317,439 | 5/1994 | Fatehi et al. | 359/110 |
| 5,657,154 | 8/1997 | Yoneyama | 359/341 |
| 5,754,320 | 5/1998 | Watanabe et al. | 359/117 |
| 5,757,526 | 5/1998 | Shiragaki et al. | 359/110 |
| 5,867,289 | 2/1999 | Gerstel et al. | 359/110 |
| 5,914,798 | 6/1999 | Liu | 359/161 |

FOREIGN PATENT DOCUMENTS 6-232721  8/1994  Japan .
7-193558  7/1995  Japan .

*Primary Examiner*—Leslie Pascal
*Attorney, Agent, or Firm*—Whitham, Curtis & Whitham

[57] ABSTRACT

It is the object of the invention to detect and locate fails in the optical network by superposing monitoring signals on respective WDM optical signals in the transmitter part of the pass-monitoring apparatus and detecting the monitoring signals on the output side of the matrix switch in an receiver part of the same. The output signals of the matrix switch are respectively splitted by the optical splitters and converted into electrical signals by O/E-converters. The monitoring signals are respectively extracted by variable band-pass filter, center frequencies of which are established by an switching information signal, from the aforementioned electrical signals. The fails of them are respectively detected by an alarm processing circuit, signals are generated for the respective transmission lines. At the same time, the alarm signal is again supplied to the matrix switch and the switching information signal is again generated. The control circuit establishes the center frequencies of the respective variable band-pass filters.

6 Claims, 2 Drawing Sheets

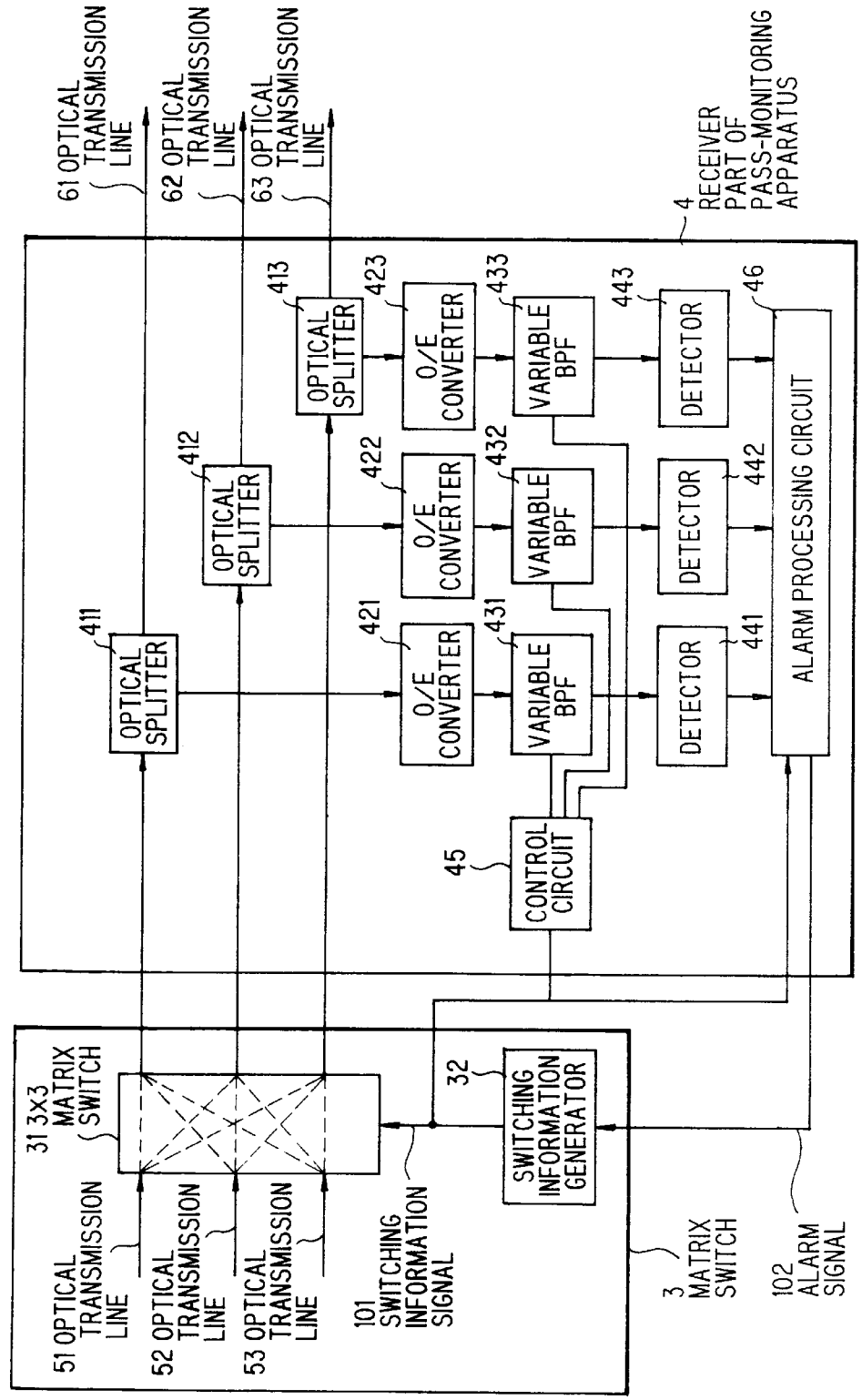

PASS-MONITORING APPARATUS OF OPTICAL NETWORK SYSTEM

FIELD OF THE INVENTION

The invention relates to a pass monitoring apparatus of an optical network system and especially to a pass-monitoring system for monitoring optical transmission lines including a matrix switch, which interchanges wavelength division multiplexed optical signals propagating through plural optical transmission lines, based on output signals of the matrix switch.

BACKGROUND OF THE INVENTION

In the conventionally used pass-monitoring apparatus of the optical network system, pass-monitoring is carried out as follows. In a transmitting station, pass-monitoring signals are superposed on a wavelength division multiplexed (WDM, hereinafter) optical signal, which is propagated through an optical transmission line, and the pass-monitoring signals are monitored in a receiving station. For example, in the pass-monitoring apparatus of the optical network system disclo ed in Japanese Patent Kokai 7-193558, the pass-monitoring signals for identifying respective signal wavelengths are multiplexed and collectively superposed on a WDM optical signals and the pass-monitoring signals are monitored regarding the respective signal wavelengths in the receiving station.

In the aforementioned apparatus, pass-monitoring is carried out between the transmitting and receiving stations via the optical transmission lines. Accordingly, when the matrix switch is inserted in the optical transmission lines, there is no means for discriminating whether monitoring of the optical transmission lines and an operation of the matrix switch normally operate or not, because the optical transmission lines are interchanged in the receiving station. Moreover, if fails arise in the optical transmission line or the matrix switch, there is no means for locating the fails.

SUMMARY OF THE INVENTION

Accordingly, it is an object of the invention to provide a pass-monitoring apparatus of an optical network system, which can be suitably used in the optical network system comprising a matrix switch and has function to detect and locate fails of the matrix switch or optical transmission lines.

According to a feature of the invention, the pass-monitoring apparatus of the optical network system comprises:

monitoring signal transmitting means, each of which superposes a monitoring signal on a wavelength division multiplexed (WDM, hereinafter) optical signal and propagates the WDM optical signal through an optical transmission line, the monitoring signal being particular to the WDK optical signal, and monitoring signal receiving means comprising:

a matrix switch for interchanging the WDM optical signals propagated through the optical transmission lines in a similar way to matrix operation in accordance with a switching information signal, and means for detecting and locating fails in the optical transmission lines or the matrix switch, based on comparison of the switching information signal with levels of the monitoring signals extracted from the WDM optical signals supplied from the matrix switch.

DESCRIPTION OF THE DRAWINGS

The invention will be explained in more detail in conjunction with appended drawings, wherein;

FIG. 2 is a block diagram of a receiving part of a pass-monitoring apparatus, shown as a preferred embodiment of the invention.

DESCRIPTION OF THE PREFERRED EMBODIMENT

Figure 1:
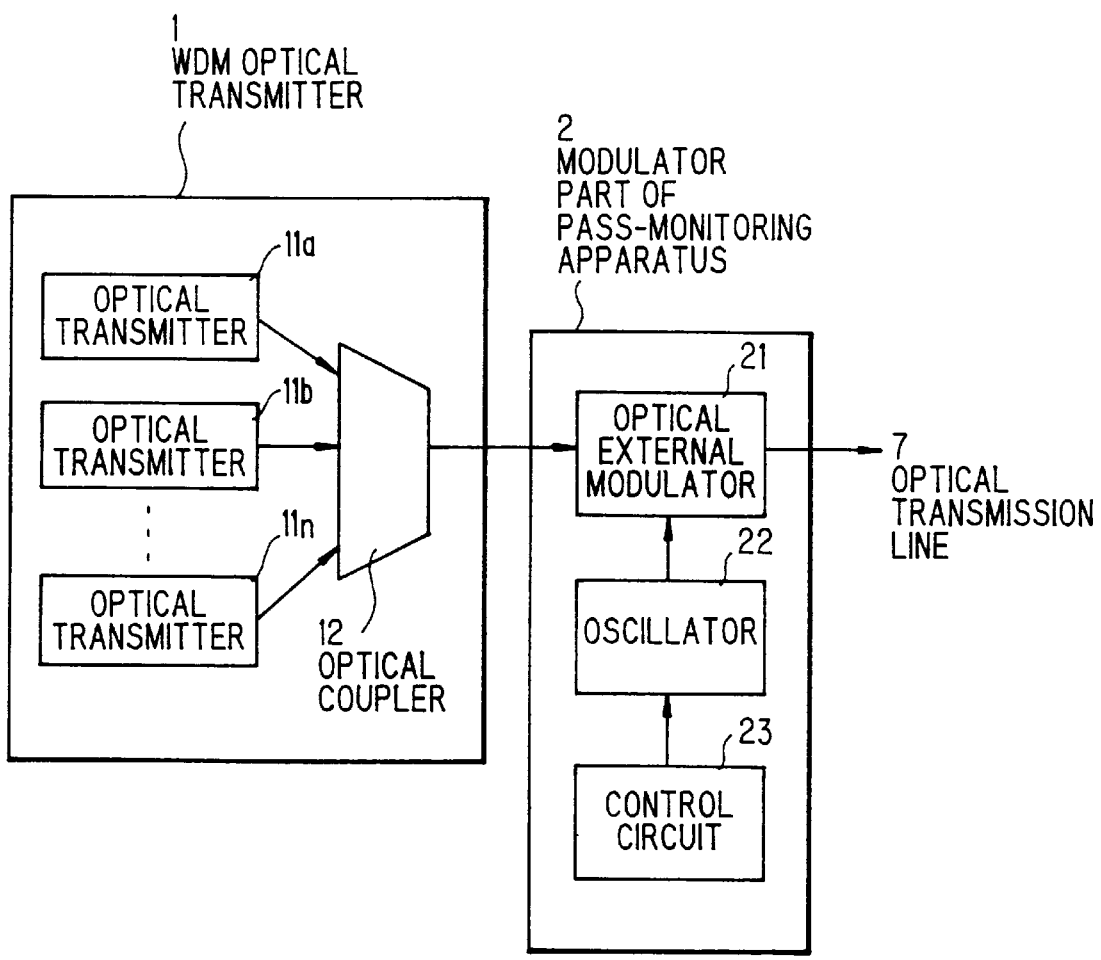
FIG. 1 is a block diagram of a transmitter part of a pass-monitoring apparatus of a pass-monitoring apparatus, shown as a preferred embodiment of the invention.

Next, a preferred embodiment will be explained referring to the appended drawings. FIG. 1 is a block diagram of a transmitter of a pass-monitoring apparatus, shown as a preferred embodiment of the invention, and FIG. 2 is a block diagram of a receiver of a pass-monitoring apparatus, shown as a preferred embodiment of the invention.

In FIG. 1, a modulator part 2 of the pass-monitoring apparatus is supplied with a WDM optical signal by a WDM optical transmitter 1, in which plural optical signals with different signal wavelengths are respectively generated by optical transmitters 11a, 11b, and 11n and multiplexed by an optical coupler 12. The modulator part 2 of the pass-monitoring apparatus 2 is composed of an optical external modulator 2 for intensely modulating a WDM optical signal by a monitoring signal and propagating it through an optical transmission line 7, and oscillator 22 for generating the monitoring signal and a control circuit 23 for establishing a frequency of the oscillator 22.

Each of transmitting stations composing the optical network system is provided with one or more combinations of the WDM optical transmitter 1 and the modulator part 2 for each system of optical transmission lines. The frequency of the oscillator is in a range of several khz to several hundred khz and particular to the corresponding optical transmission line. In other words, the monitoring signal serves as a discriminating one for each of the optical transmission lines.

In FIG. 2, a matrix switch is provided for a station, where the optical transmission lines of the optical network system are concentrated, and interchanges the optical transmission lines in a similar way to matrix operation. Although the three optical transmission lines are shown in FIG. 2 for simplicity of explanation, still larger numbers of the optical transmission lines are accommodated in practical cases. The matrix switch 3 is composed of a 3×3 matrix switch 31, which is supplied with the WDM optical signals from the optical transmission lines 51 to 53 and interchanges them in a similar way to matrix operation, and a switching information signal generator 32 for generating a switching information signal 101. Output signals of the matrix switch 3 are supplied to a receiver part 4 of the pass-monitoring apparatus.

The receiver part 4 of the pass-monitoring apparatus is composed of optical splitters 411 to 413 for respectively splitting the output optical signals of the matrix switch 3, optical to electrical (O/E, hereinafter) converter 421 to 423 for respectively O/E-converting the output optical signals of the optical splitters 411 to 413, variable band-pass filters (BPFs, hereinafter) 431 to 433 with variable passing-bands, detectors 441 to 443 for respectively detecting output signal levels of the variable BPFs 431 to 433, a control circuit 45 for establishing center frequencies of the passing-bands of the variable BPFs 431 to 433 and an alarm processing circuit 46, which discriminates the presence of the fails of the optical transmission lines or the matrix switch, based on comparison of output levels of the detectors 441 to 443 with the switching information signal 101 and generates an alarm signal.

Next, the operations of the aforementioned circuits will be explained. Portions of the optical signal powers supplied from the matrix switch 3 are respectively splitted by the optical splitters 411 to 413 and led to the O/E-converters 421 to 423. The remaining optical signal powers are respectively supplied to the transmission lines 61 to 63. In this case, optical amplifiers may be inserted in the transmission lines in order to compensate splitting losses of the signal powers. In the O/E-converters 421 to 423, the optical signals are respectively converted into electrical signals by photodetectors, voltage-amplified and supplied to next stages. The variable band-pass filters 431 to 433 respectively extract the monitoring signals through their passing band established by the control circuit 45 from the aforementioned electrical signals. The detectors 441 to 443 respectively compare the levels of the monitoring signals with their threshold levels and generate level-detecting signals, when the formers are higher than the latters.

If the alarm processing circuit 46 dose not detect the level-detecting signal from the detector, though the matrix switch has operated (the switching information signal has been received), the alarm processing circuit 46 regards the matrix switch 3 as out of order, specifies portions of the fails referring to the switching information signal and generates an alarm signal 102, which is transmitted to the switching information generator 32. The switching information generator 32 again supplies the switching information signal to the 3×3 matrix switch 31 and tries to recover its regular operation. If the fails still are not mended, a man tries to repair the matrix switch. When the aforementioned level-detecting signal is not detected stationarily, the transmission lines are regarded as extraordinary.

The control circuit 45 stores the frequencies specifying the transmission lines in its memory in advance, and establishes the center frequencies of the variable band-pass filters 431 to 433 in accordance with the switching information 101.

As mentioned in the above, in the pass-monitoring apparatus of the optical network system according to the invention, the monitoring signals are superposed on the WDM optical signals in the transmitter, the monitoring signals are detected in the output side of the matrix switch allocated in the receiving station, where the transmission lines of the optical network system are concentrated and the respective transmission lines are monitored including the matrix switch Accordingly, detections and locations of the fails in the matrix switch or the optical transmission lines can be rapidly carried out and the reactivation of the system can be quickened.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A pass-monitoring apparatus of an optical network system comprising:
   monitoring signal transmitting means, comprising:
      a plurality of optical transmitters, each of which superposes a monitoring signal on a wavelength division multiplexed (WDM) optical signal and propagates said WDM optical signal through an optical transmission line, said monitoring signal being particular to said WDM optical signal, and
   monitoring signal receiving means, comprising:
      a matrix switch for interchanging said WDM optical signals propagated through said optical transmission lines in accordance with a switching information signal, and
   means for detecting and determining the location of fails in said optical transmission lines or said matrix switch, based on comparison of said switching information signal with levels of said monitoring signals extracted from said WDM optical signals supplied from said matrix switch.

2. A pass-monitoring apparatus of an optical network system according to claim 1, wherein said matrix switch is provided with a switching information generating means for generating said switching information signal two times in accordance with an alarm signal generated when a fail is detected.

3. A pass-monitoring apparatus of an optical network system comprising:
   monitoring signal transmitting means, comprising:
      a plurality of optical transmitters, each of which superposes a monitoring signal on a wavelength division multiplexed (WDM) optical signal and propagates said WDM optical signal through an optical transmission line, said monitoring signal being particular to said WDM optical signal, and
   monitoring signal receiving means, comprising:
      a matrix switch for interchanging said WDM optical signals propagated through said optical transmission lines in accordance with a switching information signal, and
   means for detecting and locating fails in said optical transmission lines or said matrix switch, based on comparison of said switching information signal with levels of said monitoring signals extracted from said WDM optical signals supplied from said matrix switch,
   wherein said means for detecting and locating comprises:
      a plurality of optical splitters respectively connected with output ports of said matrix switch;
      a plurality of optical to electrical converters respectively connected with said optical splitters for converting output optical signals into electrical signals;
      a plurality of variable band-pass filters for respectively extracting said monitoring signals from said electrical signals;
      a control circuit for establishing center frequencies of said respective variable band-pass filters; and
      an alarm processing circuit for specifying fails in said optical transmission lines or said matrix switch and generating an alarm signal, based on comparison of said switching information signal with output signal levels of said variable band-pass filters.

4. A pass-monitoring apparatus of an optical network system comprising:
   monitoring signal transmitting means, comprising:
      a plurality of optical transmitters, each of which superposes a monitoring signal on a wavelength division multiplexed (WDM) optical signal and propagates said WDM optical signal through an optical transmission line, said monitoring signal being particular to said WDM optical signal;
      a frequency variable oscillator for generating said monitoring signal;
      a control circuit for establishing a frequency of said frequency variable oscillator; and
      an optical external modulator for modulating said WDM optical signal by said monitoring signal; and monitoring signal receiving means, comprising:
- a matrix switch for interchanging said WDM optical signals propagated through said optical transmission lines in accordance with a switching information signal, and
- means for detecting and locating fails in said optical transmission lines or said matrix switch, based on comparison of said switching information signal with levels of said monitoring signals extracted from said WDM optical signals supplied from said matrix switch.

5. A pass-monitoring device for an optical network for discriminating between fails in optical transmission lines and fails in an optical switching matrix, comprising:
- a plurality of input ports for receiving one of a plurality of optical transmission lines output from an optical switching matrix, each of said optical transmission lines carrying a frequency multiplexed signal having a unique monitoring signal superimposed thereon;
- a switching information generator for generating switching signals for controlling said switching matrix;
- a plurality of optical splitters, one connected to each of said plurality of optical transmission lines for splitting said frequency multiplexed signal;
- means for recovering said monitoring signals from said frequency multiplexed signal connected to said optical splitters; and
- means for comparing said recovered monitoring signals with said switching signals and for generating an alarm signal,
- wherein said alarm signal is feed back to said switching information generator to recover a fail in said switching matrix, if said fail is not recovered then a fail in said optical transmission line is indicated.

6. A pass-monitoring device for an optical network as recited in claim 5, wherein said means for recovering said monitoring signals comprises:
- a plurality of optical-to-electrical converters, one connected to each of said optical splitters, for converting said frequency multiplexed signal into an electrical signal; and
- a plurality of bandpass filters, one connected to an output of each of said optical-to-electrical converters, and each tuned to pass said monitoring signals.

* * * * *